United States Patent
Farmer et al.

(10) Patent No.: US 7,519,067 B2
(45) Date of Patent: Apr. 14, 2009

(54) METHOD, SYSTEM, AND COMPUTER PRODUCT FOR CONTROLLING INPUT MESSAGE PRIORITY

(75) Inventors: Jamie V. Farmer, Beacon, NY (US);
Mark R. Gambino, Brewster, NY (US);
Evan P. Jennings, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 10/931,450

(22) Filed: Sep. 1, 2004

(65) Prior Publication Data
US 2006/0045096 A1    Mar. 2, 2006

(51) Int. Cl.
*H04L 12/56* (2006.01)

(52) U.S. Cl. .............. 370/395.42; 370/412; 370/429

(58) Field of Classification Search .......... None
See application file for complete search history.

(56) References Cited

U.S. PATENT DOCUMENTS

| | | | |
|---|---|---|---|
| 5,674,003 A | 10/1997 | Andersen et al. | 364/514 R |
| 6,073,177 A | 6/2000 | Hebel et al. | 709/228 |
| 7,020,142 B2 * | 3/2006 | Kodaira | 370/395.21 |
| 2001/0048663 A1 | 12/2001 | Kodaira | 370/230 |
| 2002/0002618 A1 | 1/2002 | Vange | 709/228 |
| 2002/0165992 A1 | 11/2002 | Banerjee | 709/315 |
| 2002/0194350 A1 * | 12/2002 | Lu et al. | 709/229 |
| 2003/0182432 A1 | 9/2003 | Lawson | 709/227 |
| 2007/0294410 A1 * | 12/2007 | Pandya et al. | 709/226 |

OTHER PUBLICATIONS

N.T. Spring, M. Chesire, M. Berryman, V. Sahasranaman, T. Anderson, and B. Bershad; "Receiver Based Management of Low Bandwidth Access Links;" IEEE INFOCOM, 2000; pp. 245-254.

* cited by examiner

*Primary Examiner*—Wing F Chan
*Assistant Examiner*—Anthony Sol
(74) *Attorney, Agent, or Firm*—Cantor Colburn LLP; Lily Neff

(57) ABSTRACT

An operating system allows assignment of an input message priority to a particular socket. This priority is used by the operating system to determine what socket's inbound packets get discarded when the server resources are constrained. Sockets of a lower priority than another will have its inbound packets discarded before higher priority sockets. This allows an application to give selected sockets higher inbound message priority over other sockets.

2 Claims, 5 Drawing Sheets

US 7,519,067 B2

METHOD, SYSTEM, AND COMPUTER PRODUCT FOR CONTROLLING INPUT MESSAGE PRIORITY

BACKGROUND OF THE INVENTION

The present invention relates generally to network computing and, in particular to socket level control of input message priority.

Given a computer acting as a server for a number of network applications with a volume of inbound Transmission Control Protocol/Internet Protocol (TCP/IP) message traffic that is sufficiently high to cause system resources to be constrained, to what degree can the applications control message priority? Many existing systems provide a means for predefining one application's priority over another, however these systems do not allow for dynamic control by the application itself on a socket-by-socket basis. There is a need for dynamic control by the application on a socket-by-socket basis.

Conventionally, in a TCP/IP network when resources are constrained, messages, such as packets, are discarded by IP routers to free up resources without regard to the priority of a connection or the application using it. Some existing services allow packets for different applications to flow at different priorities within the network. However the priority value is assigned by the sending node and is primarily used for routing the packet through the network. There is a need for a way to have the receiving server control how the priority value is assigned to packets.

Priority values set by clients sending data to a server may not be aligned with the goals of the server in processing messages. Many existing servers run a single application or have multiple classes of users connected to the same application. Defining priority values at the application level does not work in these environments. There is a need for a way to define priority at different levels.

Traffic for multiple applications or different users on the same application can all flow over the same network adapter on the server. When resources in the server become constrained, typically, the server goes into shutdown mode and stops reading from the network adapter, which causes the network to discard all packets destined for the server. In some cases, resources are held by the server application, which is waiting for a response from the network. These resources cannot be freed up until the response from the network is received. This can result in a deadlock condition where the server is in shutdown, the only way to get out of shutdown is for the server application to free its resources, but this cannot happen because the network response cannot be received in shutdown mode. There is a need for a way to manage server resources to avoid this deadlock condition.

FIG. 1 shows an exemplary prior art environment. A server 100 communicates with clients 102 over an IP network 104. The server 100 has a first application 106 and a second application 108 in communication with a TCP/IP stack 110. The TCP/IP stack 110 is a general term for the specific TCP/IP implementation of an operating system (e.g., a stack may have an application layer, a transport layer, an internet layer, and a network interface layer). The TCP/IP stack 110 is in communication with network interfaces 112, which connect the server 100 to the IP network 104. FIG. 1 shows a master-slave relationship, but peer-to-peer or any relationship using an IP network is similar.

FIG. 2 shows packets flowing from storage in the network interfaces 112 to applications 106, 108 in the prior art. Inbound packets 200 arrive from IP network 104 and are placed in buffers 202 associated with the network interfaces 112. Packets 200 are moved from the buffers 202 to storage 204 in the TCP/IP stack 110. Storage 204 includes TCP/IP stack packet buffers and other storage mechanisms, such as queues. Slots in the storage 204 are freed when data is read by a read( ) instruction 206 in an application 106, 108. Without priority processing, when there is no space in the buffers to accept a packet, it is discarded.

SUMMARY OF THE INVENTION

A first aspect is a method of controlling message priority. A priority is dynamically assigned to a plurality of incoming messages. The assignment is performed by a receiving system that is receiving the incoming messages. The incoming messages are placed in a storage. The storage is available for use by at least one application in the receiving system. The storage at the receiving system is managed by using the assigned priority to identify a portion of the incoming messages in the storage to discard when needed to make space available.

Another aspect is a system for controlling message priority comprising a message classification layer, a storage, and a resource manager. The message classification layer assigns a priority to each incoming message. The message classification layer is interposed between network interfaces and a TCP/IP stack in an operating system at a receiving node. The storage is in the TCP/IP stack and holds a plurality of incoming messages. The resource manager is in the operating system and discards at least one incoming message from the storage based on the assigned priority, when additional space is needed in the storage. The socket-level priority overrides any other type of priority.

Another aspect is a computer program product for controlling message priority. The computer program product may be any type of software, hardware, firmware, or any combination thereof. For example, the computer program product may have instructions stored on a medium, such as a compact disk (CD) or a website. The computer program product controls message priority by receiving an incoming message at a receiving system and classifying the incoming message by applying a socket-level priority, application-level priority, or system default-level priority to the incoming message, according to a specification associated with the incoming message. It is determined whether a buffer in the TCP/IP stack at the receiving system has space for the incoming message. If there was not space in the buffer, the incoming message is queued, after discarding at least one message in the buffer based on priority. The socket-level priority takes precedence over application-level priority and application-level priority takes precedence over system default-level priority.

BRIEF DESCRIPTION OF THE DRAWINGS

Referring to the exemplary drawings wherein like elements are numbered alike in the several FIGURES.

DETAILED DESCRIPTION OF THE INVENTION

Figure 1:
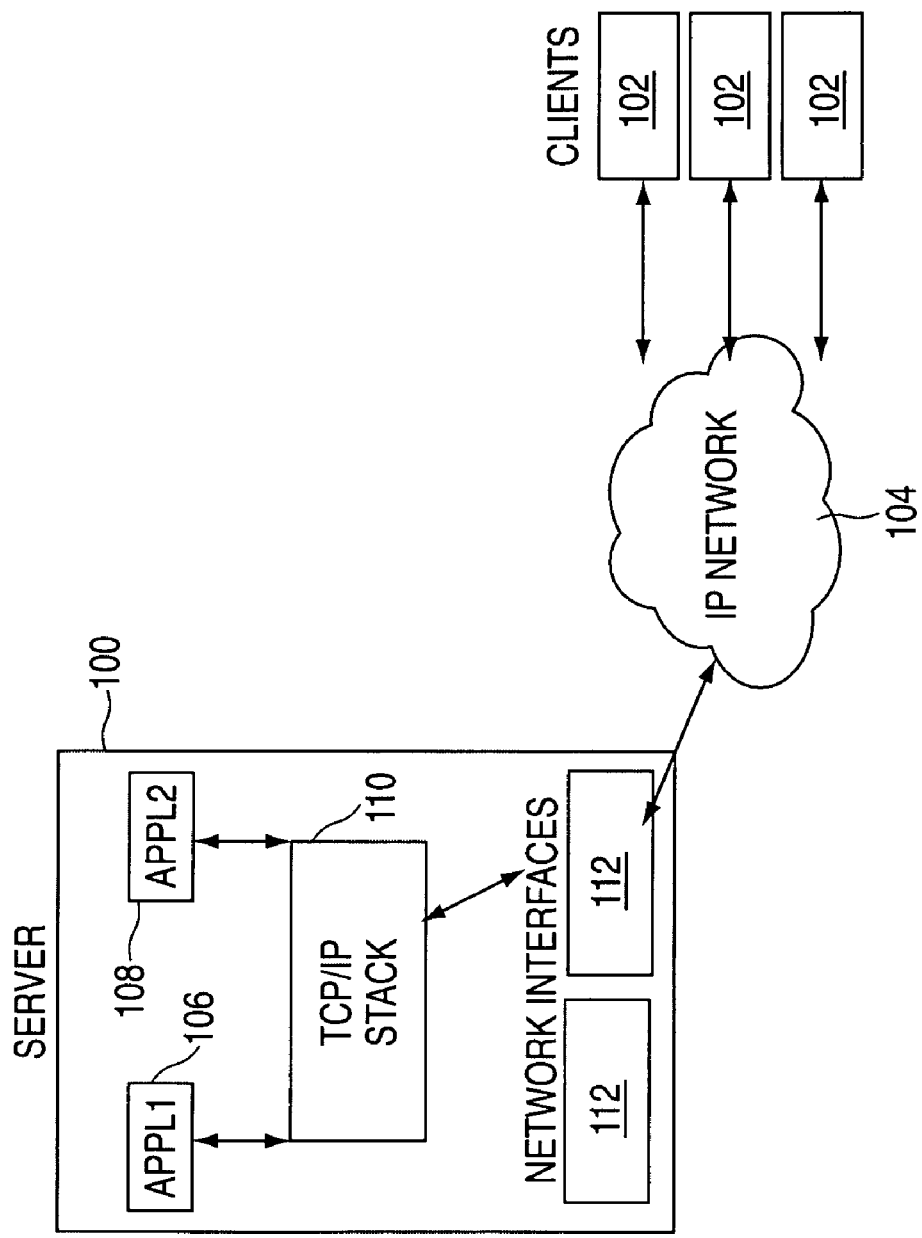
FIG. 1 is a block diagram of an exemplary prior art environment.
Figure 2:
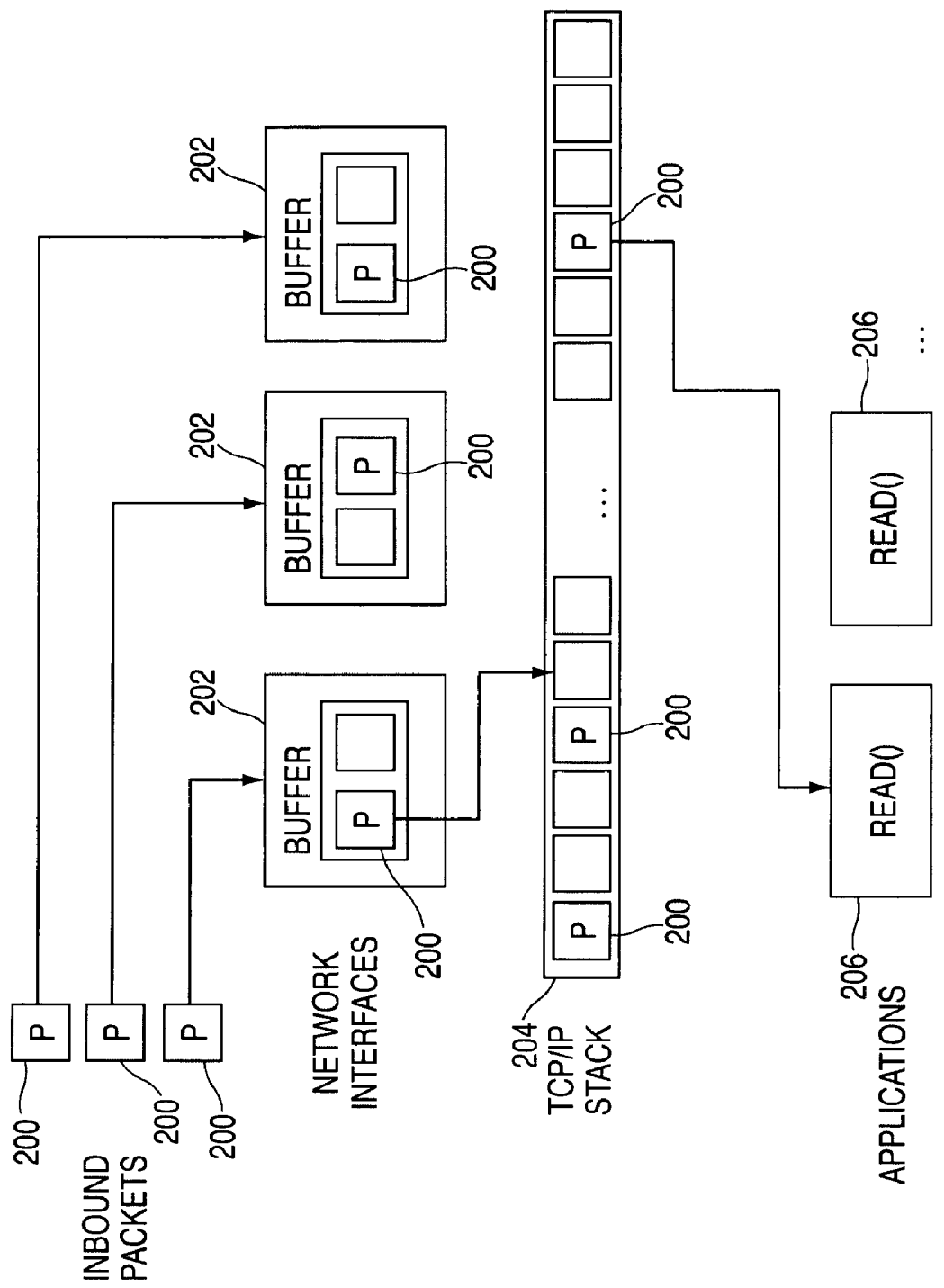
FIG. 2 is a block diagram illustrating packet flow from network interfaces to applications in the prior art.
Figure 3:
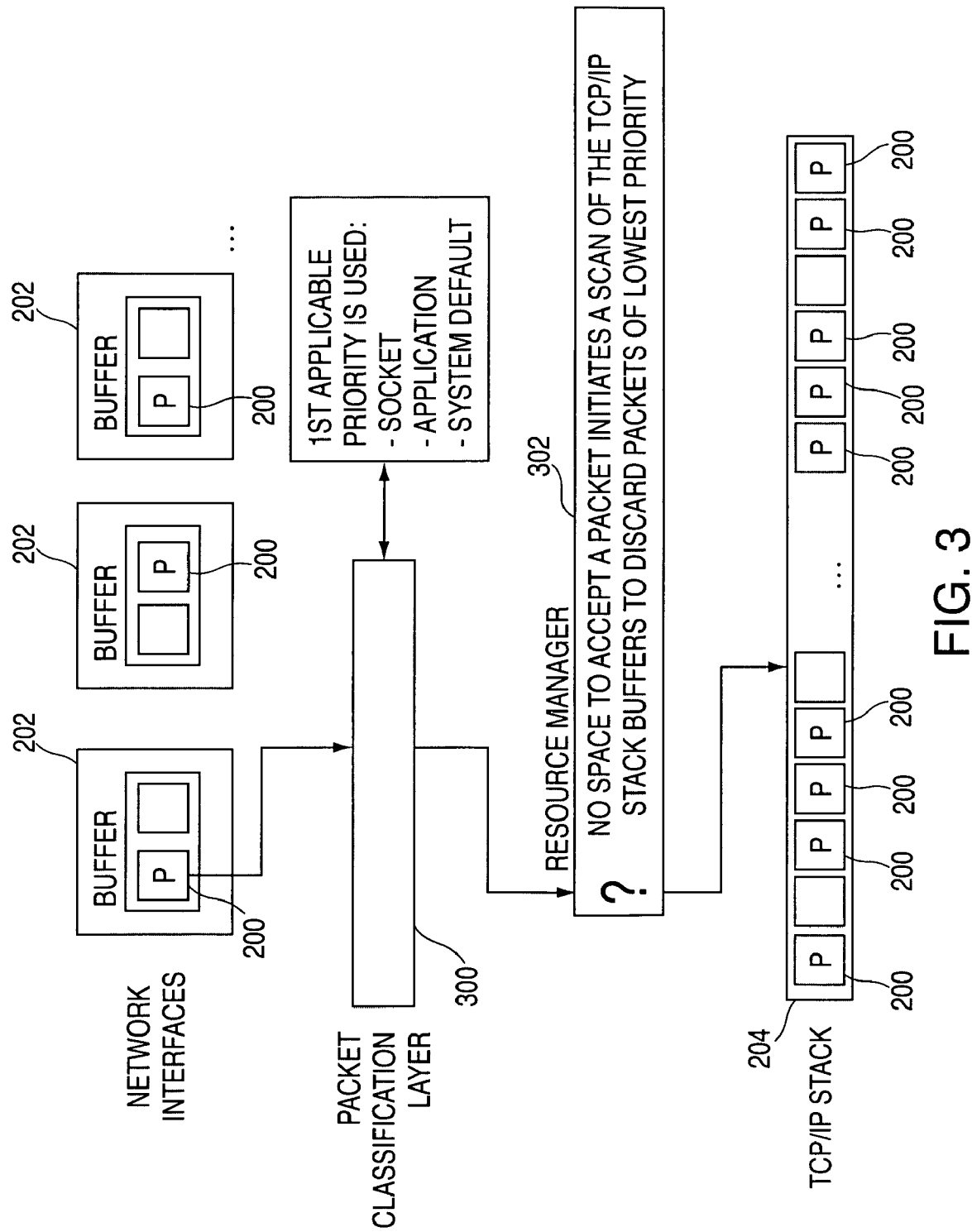
FIG. 3 is a block diagram illustrating application or socket specified priority processing according to various embodiments of the present invention.

FIG. 3 illustrates application or socket specified priority processing according to various embodiments of the present invention. A packet classification layer 300 between the network interface buffers 202 and the storage 204 includes a process that assigns each packet 200 a priority. In one embodiment, the first applicable priority level is used: socket, application, or system default. A socket is an independent point of control for sending and receiving data. An application can have multiple sockets. A system can have multiple applications. Other embodiments have various other hierarchies defining how to specify the priority. When there is no space in the storage 204 to accept a packet 200, a resource manager 302 initiates a scan of the storage 204 to discard packets 200 having the lowest priority. This is advantageous because it gives the receiving system control over inbound packets 200, which is a significant advantage when there is contention or locking between the client and server. When resources are being held and locked waiting for the client, it is not good to discard. In situations like this the server application can dynamically increase the priority of this socket to ensure the expected data from the client that the server application is waiting for will not be discarded and will be processed by the server. This reduces contention and the potential for deadlocks or timeouts on busy servers. Control on the server side, rather than client side, adds to the advantages through the internal knowledge of applications, how the priorities are assigned and the like. This enables the server to give preferential treatment to particular business partners and tune the system accordingly to meet service level agreements (SLAs) that are in place.

Figure 4:
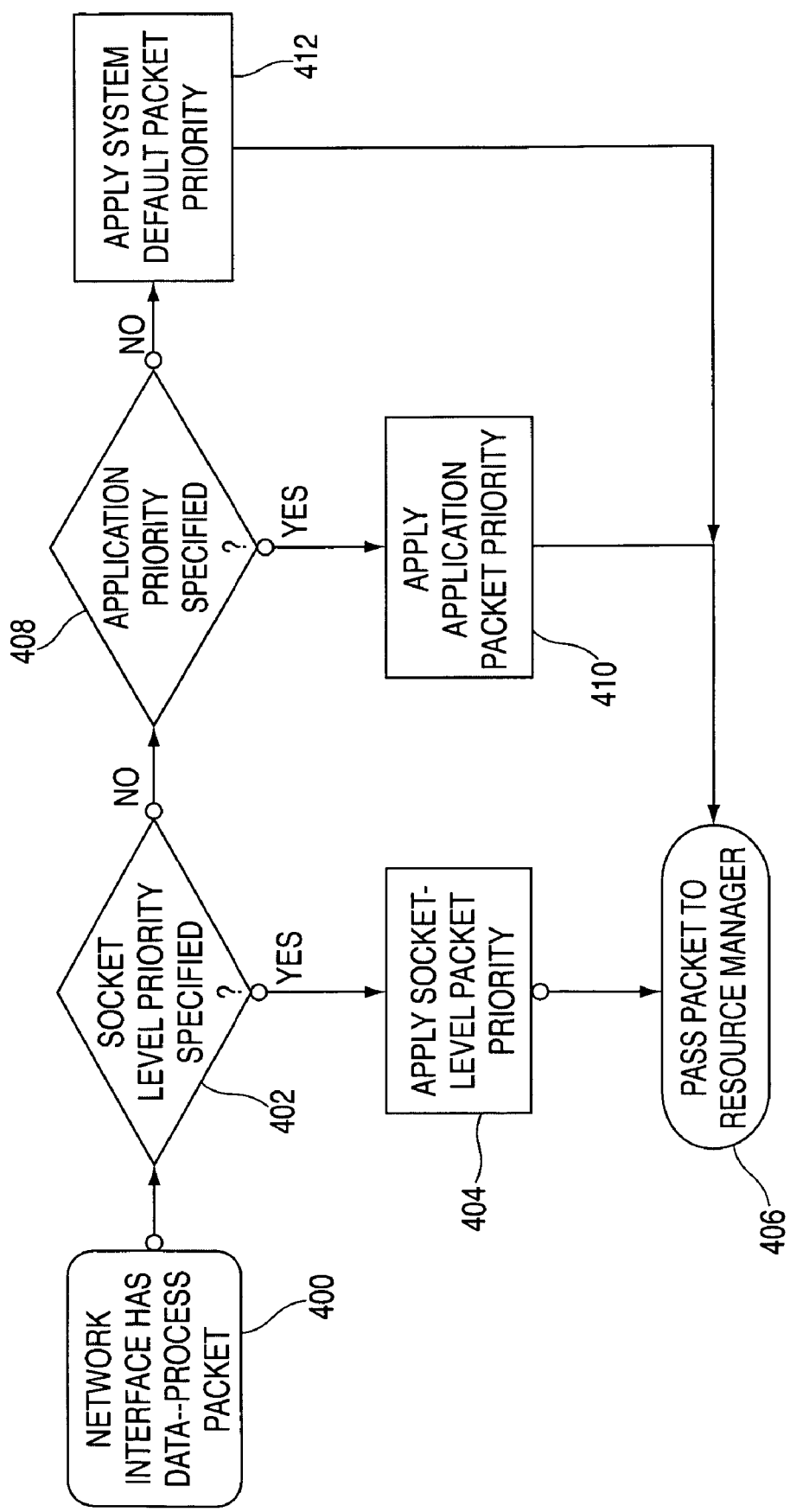
FIG. 4 is a flowchart illustrating a packet classification process according to various embodiments of the present invention.

FIG. 4 illustrates a packet classification process according to various embodiments of the present invention. This packet classification process may be performed by packet classification layer 300 (See FIG. 3). When the network interface has data it processes the packet at 400. It is determined whether there is a socket-level priority specified for the packet at 402. The socket-level priority may be assigned in an application and modified. If there is a socket-level priority, it is applied at 404 and the packet is passed to the resource manager 302 (See FIG. 3) at 406. If there is not a socket-level priority, then it is determined whether there is an application priority specified at 408. If there is an application priority specified, then it is applied at 410 and the packet is passed to the resource manager 302 (See FIG. 3) at 406; otherwise, the system default packet priority is applied at 412 before the packet is passed to the resource manager 302, as shown in FIG. 3, at 406. In an alternate embodiment, there is no application priority.

Figure 5:
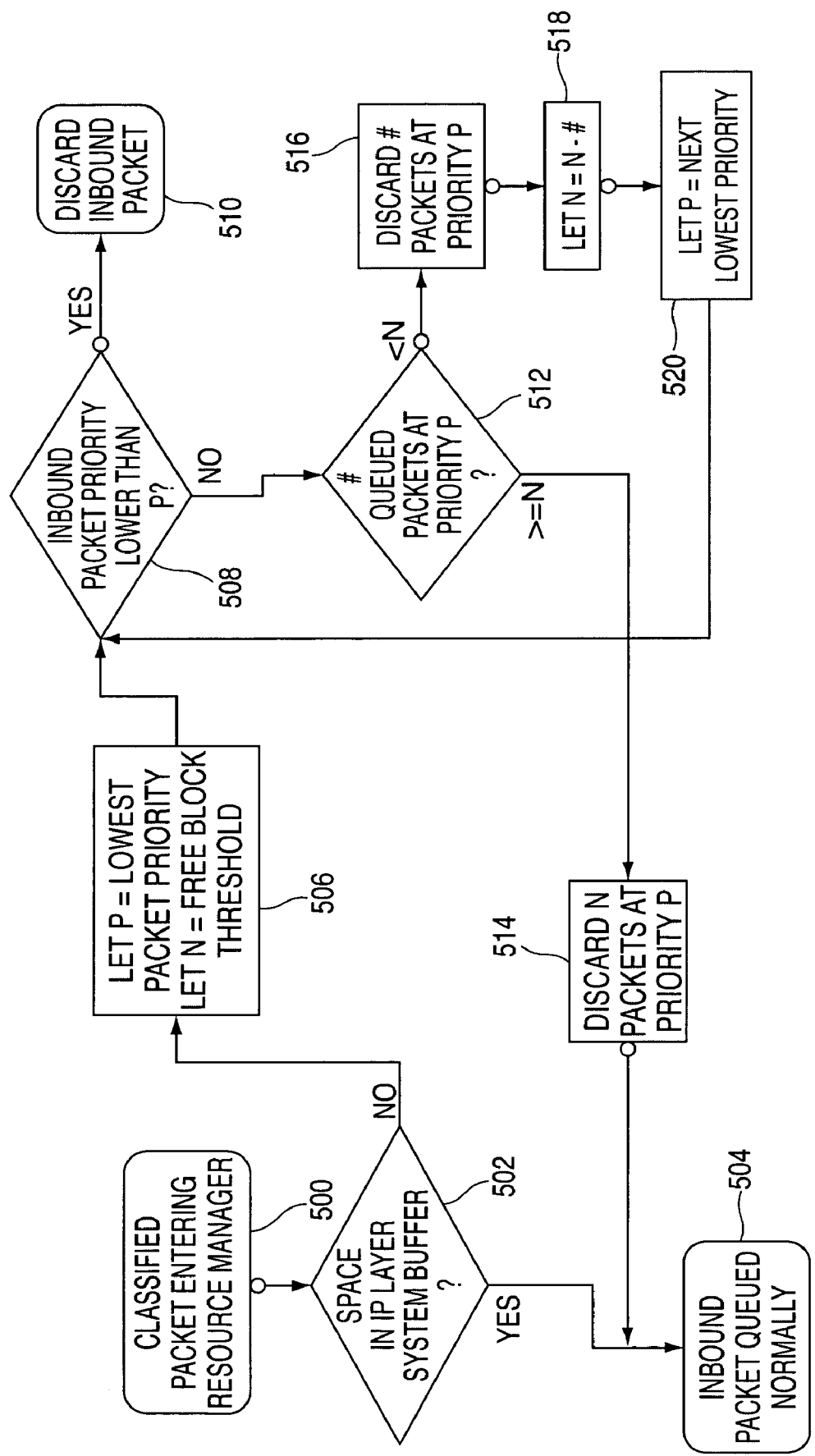
FIG. 5 is a flowchart illustrating a process of discarding packets according to various embodiments of the present invention.

FIG. 5 illustrates a process of discarding packets according to various embodiments of the present invention. This process of discarding packets may be performed by resource manager 302 (See FIG. 3). After the classified packet enters the resource manager 302 (See FIG. 3) at 500, it is determined whether there is space in the system buffer at 502. If there is space, the inbound packet is queued normally at 504. If there is no space, let p=the lowest packet priority and let N=the free block threshold at 506 and determine whether the inbound packet priority is lower than p at 508. If the inbound packet priority is lower than p, then the inbound packet is discarded at 510; otherwise it is determined whether the number of queued packets at priority p is greater than or equal to N at 512. In an alternate embodiment, if the inbound packet priority is lower than p, the inbound packet is not discarded, because even if the inbound packet is discarded, it will never displace a higher priority packet that is already queued. If the number of queued packets at priority p is greater than or equal to N, then N packets at priority p are discarded at 514 and the inbound packet is queued normally. If the number of queued packets at priority p is less than N, then a predetermined number i of packets at priority p are discarded 516, let N=N−i at 518, let p=the next lowest priority at 520, and then determined whether the inbound packet priority is lower than p at 508. Various embodiments have any number of priority levels, such as 2 or 2,000. One exemplary embodiment has 9 priority levels with 9 as the lowest and 1 as the highest, N=200 and i=100.

An exemplary embodiment allows assignment of an input message priority to a particular socket. This priority is used by the operating system to determine what socket's inbound packets get discarded when the server resources are constrained. Sockets of a lower priority than another will have its inbound packets discarded before higher priority sockets. This allows an application to give selected sockets higher inbound message priority over other sockets. For example, a banking application that communicates with both ATM machines and other banks can give the sockets communicating with a first bank priority one (high), all other banks' sockets priority two (medium), and ATM machines priority three (low). In this example, if resources in the server become constrained, any messages from ATM machines will be discarded before the priority two messages from other banks. Inbound messages from the first bank won't be discarded at all. While this example shows only three priority values, any number of priorities can be defined.

In this example, messages for sockets marked as the highest priority are always processed. This enables the server to avoid the deadlock conditions described above. For this to work, the server reads traffic from the network adapter, even if the server is low on resources (previously described as shutdown mode). The server might discard most of the traffic read in, but the highest priority traffic will still be processed in an effort to free up resources held in the server. It is possible to dynamically change the priority of a socket. While waiting for new work to arrive, the application might mark the socket as "medium" priority. However, in the middle of a distributed transaction, the application might be holding many resources and need to mark the socket as "high" priority to make sure data from the remote node is received and processed to free up resources on the server. After the transaction ends, the application can mark the socket as "medium" priority again.

In this example, the inbound socket priority is used by the TCP/IP stack to select candidates for inbound message deletion if further inbound messages cannot be processed due to exhausted resources. In addition to the ability to discard inbound messages based on a priority value, the priority can be set on a per socket (connection) basis (rather than at the application level) and the priority value for a given socket can be dynamically changed by the application throughout the life of that socket. TCP/IP traffic may be read in from the network by the server at all times, so that the highest priority traffic can be processed, regardless of resource conditions.

As described above, the embodiments of the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. For example, protocols other than TCP/IP, such as packet-based protocol X25 may be used for practicing various embodiments of the present invention. Furthermore, any unit of data or message in other formats in addition to packets may be used. In addition, many modifications may be made to adapt a particular situation or material to the teachings of the invention without departing from the essential scope thereof. Therefore, it is intended that the invention is not to be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of controlling input message priority, comprising:

dynamically assigning a priority to a plurality of incoming messages, the assignment being performed by a receiving system that is receiving the incoming messages;

placing the incoming messages in a storage, the storage being available for use by at least one application in the receiving system;

managing the storage at the receiving system by using the assigned priority to identify a portion of the incoming messages in the storage to discard, when needed to make space available;

wherein the priority has a type selected from a group including socket-level, application-level, and default-level; and wherein socket-level priority takes precedence over application-level priority and application-level priority takes precedence over default-level priority;

determining whether there is space in the storage for one of the incoming messages;

if there is no space in the storage, letting p=a lowest packet priority and let N=a free block threshold;

determining whether the one incoming message priority is lower than p;

if the one incoming message priority is higher than p, determining whether a number of queued packets at priority p is greater than or equal to N;

if a number of queued packets at priority p is greater than or equal to N, then discarding N packets at priority p and queuing the one incoming message normally;

if the number of queued packets at priority p is less than N, then discarding a predetermined number i of packets at priority p; and letting N=N−i, p=the next lowest priority, and then determining whether the incoming message priority is lower than p.

2. The method of claim 1, wherein the storage is a queue associated with a Transmission Control Protocol/Internet Protocol (TCP/IP) stack in the receiving system.

* * * * *